US009815719B2

United States Patent
Sayre et al.

(10) Patent No.: US 9,815,719 B2
(45) Date of Patent: Nov. 14, 2017

(54) WATER TREATMENT SYSTEM

(71) Applicant: Bio-Lab, Inc., Lawrenceville, GA (US)

(72) Inventors: Curtis Sayre, Atlanta, GA (US); Zach Hansen, Atlanta, GA (US); David Rouse, Lawrenceville, GA (US); Anna Florine McLeroy, Lilburn, GA (US)

(73) Assignee: Bio-Lab, Inc., Lawrenceville, GA (US)

(*) Notice: Subject to any disclaimer, the term of this patent is extended or adjusted under 35 U.S.C. 154(b) by 1110 days.

(21) Appl. No.: 13/854,363

(22) Filed: Apr. 1, 2013

(65) Prior Publication Data
US 2014/0027358 A1 Jan. 30, 2014

Related U.S. Application Data

(60) Provisional application No. 61/674,918, filed on Jul. 24, 2012.

(51) Int. Cl.
| *C02F 1/68* | (2006.01) |
| *E03D 9/03* | (2006.01) |
| *E04H 4/12* | (2006.01) |
| *C02F 1/72* | (2006.01) |
| *C02F 1/76* | (2006.01) |
| *C02F 103/42* | (2006.01) |

(52) U.S. Cl.
CPC .......... *C02F 1/688* (2013.01); *E03D 9/038* (2013.01); *E04H 4/1281* (2013.01); *C02F 1/722* (2013.01); *C02F 1/766* (2013.01); *C02F 2103/42* (2013.01); *C02F 2305/14* (2013.01)

(58) Field of Classification Search
CPC .......... C02F 1/688; C02F 1/722; C02F 1/766; C02F 2103/42; C02F 2305/14; E04H 4/1281; Y10T 137/4891; E03D 9/038
See application file for complete search history.

(56) References Cited

U.S. PATENT DOCUMENTS

| 429,384 A | * | 6/1890 | Manwaring | ............... C02F 1/42 |
| | | | | 119/348 |
| 2,934,409 A | * | 4/1960 | Biehl | ...................... B01J 4/001 |
| | | | | 116/200 |

(Continued)

FOREIGN PATENT DOCUMENTS

WO    WO 2007/029183 A2    3/2007

OTHER PUBLICATIONS

Written Opinion of the International Preliminary Examining Authority of International Application No. PCT/US2013/040039, dated Aug. 8, 2014, 6 pages.

*Primary Examiner* — Terry Cecil
(74) *Attorney, Agent, or Firm* — Merchant & Gould P.C.

(57) ABSTRACT

A system for dispensing water treatment compositions into a pool, spa, or other body of water is disclosed, which system provides a visible cue that the water treatment is properly dispersing and also provides a visible cue when the desired amount of water treatment has been dispensed. The system comprises a dispenser and the water treatment composition contained within the body of the dispenser, which dispenser and which system provides a readily visual cue that when the water treatment dose has been fully, or in some cases mostly or partially dispersed. For example, the dispenser sinks when fully dosed and resurfaces when empty, and in particular embodiments the water treatment generates visible gas bubbles and/or a color stream as the treatment dissolves.

16 Claims, 2 Drawing Sheets

(56) References Cited

U.S. PATENT DOCUMENTS

| | | | |
|---|---|---|---|
| 3,867,101 A | | 2/1975 | Herring |
| 4,532,722 A | * | 8/1985 | Sax ..................... D06F 58/203 206/0.5 |
| 4,534,070 A | * | 8/1985 | Hauptmann ............ E03D 9/038 116/227 |
| 4,692,314 A | * | 9/1987 | Etani ........................ B05B 7/04 137/268 |
| D412,198 S | * | 7/1999 | Bonelli ....................... D23/208 |
| 7,560,033 B2 | | 7/2009 | Lightcap et al. |
| 2011/0132848 A1 | * | 6/2011 | Diaz ...................... C02F 1/688 210/764 |

\* cited by examiner

WATER TREATMENT SYSTEM

This application claims benefit under 35 USC 119(e) of U.S. Prov. Appl. No. 61/674,918, filed Jul. 24, 2012, the disclosure of which is incorporated herein by reference.

This invention relates to a system for treating recreational water, such as pool and spa water, comprising a select dispenser and water treatment composition which provides a visual signal to show that the water treatment is properly dispersing into the water, and a signal to show when the dispersion of a selected dose of water treatment is complete.

BACKGROUND OF THE INVENTION

The use of dispensers to disperse water treatment compositions, typically chemical compositions, into bodies of water, such as swimming pools and spas, is long known. Typically these dispensers have either floated on top or just beneath the surface of water, or have been employed in the flow loop of forced circulation systems, e.g., skimmer type dispensers placed within the pool filter system. Dispensers are used with fast dissolving chemicals, such as calcium hypochlorite, and slower dissolving chemical systems containing trichloroisocyanurate.

In many floating dispensers, the upper end of the housing of the device is circumscribed by a buoyant material so that the device floats in an upright orientation with its upper end above the water line when placed in a pool. One or more openings are provided at the lower end of the housing to allow water to enter the housing, dissolve the tablets, and provide a flow of a solution that disinfects and otherwise treats the water, for example, a stream of halogen solution that disinfects and otherwise treats the water.

In operation, the size, number, or path length of water-admitting openings in the housing control the water flow through the device and the dose is managed by selecting an appropriate amount of the chemical formulation, often tablets, which are placed inside the housing. The device is placed in the body of water, e.g., pool or spa, water circulates through the opening or openings in the lower end of the housing, the water treatment dissolves and is dispensed throughout the body of water until the entire water treating chemical has dissolved.

While simple in design and operation, difficulties can be encountered when using these devices. For example, many of these floating devices provide no indication when the amount of water treatment has been fully dissolved or dispersed. It is also possible that the openings through which the dissolved water treatment must flow become plugged, slowing or stopping dispersion of the desired treatment into the pool. Further, although dispensers are known which will signal when the water treatment has been fully or mostly dispersed, in many cases the visual signal can be difficult to detect without careful examination or is provided in an inelegant way which compromises the aesthetics of the device. For example, one known floating chemical dispenser signals complete dissolution of the treatment by having a buoyant housing list over to one side.

U.S. Pat. No. 8,007,664, the disclosure of which is incorporated herein by reference, discloses a dispenser which has a floating bucket for carrying a solid, dissolvable water treatment chemical, which bucket is connected to a set of tabs which become visible as the chemical dissolves and the bucket floats higher in the water.

U.S. Pat. No. 5,662,795, the disclosure of which is incorporated herein by reference, discloses a skimmer-basket type chemical dispenser which includes a buoyant colored plate within a cylindrical container that floats to the top when all of the chemical is dissolved. However, the resulting visual signal (i.e. the portion of the plate visible through a top-mounted dispenser opening) is visible only within a narrow, vertical cone circumscribing a central axis of the cylindrical container and such a signaling mechanism would be ineffective in a floating dispenser located in a central portion of the pool, as the signal generated would be difficult if not impossible to see from a side angle. Typically, dispensers in the prior art provide no signal to show that the device is working properly.

While it has been common to associate dispensers such as pool dispensers with chlorine sources such as hypochlorite salts and chloroisocyanurates, a variety of other water treatments can be added through a dispenser, including non-halogen oxidizers, pH altering agents, flocculants and so on. Often, more than one type of chemical agent can be used at a time. U.S. Pat. No. 7,560,033, incorporated herein by reference, discloses a stable, solid, anhydrous composition comprising an oxidizing agent, i.e. Oxone® which is a source of potassium peroxymonosulfate, and an active halogen agent, e.g., a salt of dichloro-s-triazine trione. Note: Oxone® and compounds containing halides or active halogens can form a dangerous combination capable of releasing harmful amounts of chlorine gas.

SUMMARY OF THE INVENTION

The invention provides a system for dispensing a water treatment, the system comprising a dispenser and a dose of dissolvable water treatment composition contained within the body of the dispenser, wherein the system, when placed in a body of water, provides a visible signal showing that the water treatment is properly dissolving and dispensing, for example, a soluble colorant, e.g., a dye, a colored fine particle e.g., a pigment, and/or gas bubbles are released from the dispenser as the water treatment dissolves, and a visible cue when the water treatment dose has been fully, or in some cases mostly or partially dispersed, for example, the body of the dispenser sinks below the surface of the water when fully dosed and resurfaces to be visible above the surface when all or a selected amount of the dose has been dispensed. There is no limitation placed on the type of water treatment that is dispersed, e.g., in some embodiments the water treatment composition is a solid composition, however, dissolving in the context of the invention may also include, e.g., a process where two liquids form a single solution.

The dissolvable water treatment composition, which itself is a particular embodiment of the invention, comprises one or more active chemical water treatment components, for example, a biocide, clarifier, oxidizer, sanitizer, buffer, acid source, alkalinity source, or other water treatment chemical, and a means for producing a signal that the composition is properly dispensing, for example, a colorant or a means for forming gas bubbles, which signal is readily visible as the water treatment composition dissolves.

The body of the dispenser defines a fully enclosed internal hollow region for holding the water treatment composition and is provided with holes in the body so that water can enter the hollow region, dissolve the water treatment composition, and then allow the aqueous solution or suspension of water treatment thus produced to return to the body of water being treated. The holes, or openings, are large enough to allow for the water to enter and exit the body at an appropriate rate, but are small enough so that the water treatment composition does not prematurely exit the dispenser, e.g., before it sufficiently dissolves.

DESCRIPTION OF THE INVENTION

One general embodiment of the invention provides a system for dispensing a water treatment composition into water, said system comprising a dissolvable water treatment composition and a dispenser that sinks in a body of water when containing a selected full dose of the water treatment composition, and floats in water either when empty or when the dispenser contains a selected minor dose of the water treatment composition
wherein the dispenser comprises a body defining a fully enclosed hollow internal region designed to accept a dissolvable water treatment composition, wherein said body is equipped with a plurality of openings, in a number, size and placement, to a) allow for entrance of water into the hollow internal region thereby contacting and dissolving the water treatment composition to create an aqueous solution and/or suspension of components of the water treatment composition, b) allow for said aqueous solution or suspension of components to exit the body and enter the water, and c) allow for the release of any gasses generated by dissolution of the water treatment composition so that any gas created during dissolution of the water treatment composition escapes the body and does not accumulate to an extent where it causes the dispenser to float in water before the desired amount of water treatment has been dispensed,
and wherein the dissolvable water treatment composition either produces gas bubbles or releases a colorant as the water treatment dissolves.

That is, the dispenser body without added components has sufficient buoyancy to float on water, but is designed to accept components, including water treatment compositions and possibly other inert dissolvable materials, that will cause the body to sink in water, which components dissolve or otherwise detach from the body over time, thus allowing the body to return to the surface. The dispenser may have attached to the body various items not directly related to water treatment dispersion, e.g., a flag marking the position of the dispenser or various decorative components. There is no requirement that such items not necessary for the dispensing of water treatment sink or float at any time.

In the present disclosure, 'the dispenser sinks in a body of water' when dosed, meaning that the entire body of the dispenser is submerged beneath the surface of the water. This includes the case where the body is fully submerged just under the surface of the water, e.g., completely submerged but in close proximity to the surface, fully submerged at the bottom of the body of water, e.g., in contact with the bottom of the body of water, and at any depth in between these two extremes. In many embodiments a fully dosed dispenser will come into contact with the bottom of the body of water.

When the dispenser, or body of the dispenser, 'returns to the surface', it means that the body is no longer fully submerged and that a portion, typically a majority portion of the body of the dispenser, is visible above the surface of the water.

Obviously, as with other dispensers, dissolved or suspended water treatment is dispensed as the water treatment dissolves as opposed to first dissolving in its entirety before any dispersion takes place. A 'selected full dose of the water treatment composition' is the amount of water treatment sufficient to bring about the desired treatment which is added to the dispenser prior to placing the dosed dispenser in the water to be treated. A 'selected minor dose of the water treatment composition' is the portion of water treatment that in some embodiments of the invention remains undissolved and within the body of the dispenser when the dispenser returns to the surface of the water.

Thus, in many embodiments, the dispenser of the invention sinks in water when fully dosed and returns to the surface after all, or essentially all, of the water treatment composition has dissolved, while other embodiments relate to a dispensing system wherein a fully dosed dispenser sinks in the water being treated and returns to the surface after a portion, for example, a majority portion, i.e., over 50%, of the water treatment composition has dissolved. 'Essentially all of the water treatment composition being dissolved' refers to a situation where a small amount, i.e., less than 10%, less than 5% or less than 2%, of the initial dose remains is all that remains within the body of the dispenser. Percentages refer to weight percent based on the total weight of the initial water treatment dose.

In the case where the dispenser returns to the surface when a selected minor dose of the water treatment composition remains, the select minor dose remaining is often, but not necessarily, 50% or less of the initial dose of water treatment composition. In such cases the remaining minor dose is not an exact figure in part because there are many variables to consider and not all are within the control of the user of the device. For example, the water being treated may contain other materials, such as other water treatments or dissolved substances which alter the density of the water which will impact exactly how much added material must dissolve before the dispenser floats. Other factors include the size of dispenser being used, the specific formulation of the water treatment etc leading to some variance. Generally though, the device can be readily calibrated so that the impact on the buoyancy of the dispenser of a known dose of a known water treatment composition can be reasonably estimated.

Generally speaking, the water treatment composition added to the dispenser has a density of greater than 1 to overcome the buoyancy of the dispenser body. The material with a density greater than 1 does not itself have to be an active component of the water treatment and can be added either as part of the water treatment composition or as a separate component for the purpose of increasing the overall density of the system causing the dispenser to sink. The amount of added material, active or otherwise, needed to cause the dispenser to sink, or remain submerged, will be less for a dispenser having a body that is very close to the density of water or if the added material has a very high density, than if the dispenser has an exceedingly low density or if the added material has a density close to that of water.

As stated above, material added to increase the overall density of the dispenser system need not be active water treatment materials, for example, inert material or formulation adjuvants are often part of a water treatment composition, dissolving salts may be added to the dispenser to provide a certain amount of ballast to a region of the dispenser, to temporarily block some or all of the openings in the body, or simply to aid in the sinking of the device, among other reasons. For example, in some embodiments a soluble material such as an inert salt may be attached to either the inside or outside of a certain portion of the body so that the portion settles to the bottom of the body of water faster orienting the sunken dispenser on a particular position.

In one embodiment the dissolvable water treatment composition comprises a means for producing gas bubbles as it dissolves which signals that the device is working. Typically in such an embodiment, the openings in the body of the dispenser are of a number, size and placement selected so that gas created during dissolution of the water treatment composition does not cause the dispenser to float in water before the desired amount of water treatment is has been dispensed. Typically in this embodiment the gas being released from the dispenser will produce a visible foaming or fizz to show that the dispenser is functioning. Typically, the components generating the gas are an integral part of the water treatment composition and the fizzing continues until the composition is dissolved. While in use, the gas produced may be such that it will cause the dispenser to move while submerged and in some embodiments the gas produced may cause the dispenser to move up and down in the water.

In other embodiments the dissolvable water treatment composition releases a color into the water being treated as it dissolves which signals that the device is working. The color is typically due to the presence of a colorant, e.g., dye or pigment, that is released as the water treatment dissolves, or it may be the result of a chemical reaction. The amount of colorant when present in the composition is small, less than 1 wt %, often less than 0.5 wt %, in one embodiment 0.1 wt % or less, and is visible as it exits the dispenser but often becomes less visible as it disperses into the body of water. The colorant can be used with or without the above means for producing gas bubbles and is easily removed from the water by normal pool or spa maintenance, e.g., via vacuum or filter.

The body of the dispenser can have any shape, e.g., a standard geometric shape such as a generic sphere, ovoid, pyramid, cube etc., or the dispenser can have a more custom design, and include various ornamental features. In some embodiments of the invention, the body is an ovoid, such as an egg or American football design, a flattened ovoid, such as an egg wherein the wider part is flat instead of rounded, or a pyramid. The actual shape of the dispenser is not necessarily important to the invention, but in some embodiments the shape of the dispenser is chosen to accentuate various specific features of the invention.

For example, when used with a water treatment that releases gas bubbles as it dissolves, a dispenser shaped as a pyramid or egg can accentuate the visibility of the fizzing caused by gas evolution, by having the gas bubbles escape through a narrow portion of the structure.

The body of one particular embodiment of the invention is illustrated in the attached drawings, FIGS. 1, 2 and 3. This particular body design can be used with a number of water treatment formulations including those formulations producing a fizzing signal as the treatment is dissolving, those that do not fizz, those that release a colorant etc. Of course the drawings illustrate only one particular body useful in the present invention, other body sizes and shapes are readily envisioned and can be constructed using the information provided herein.

Figure 1:
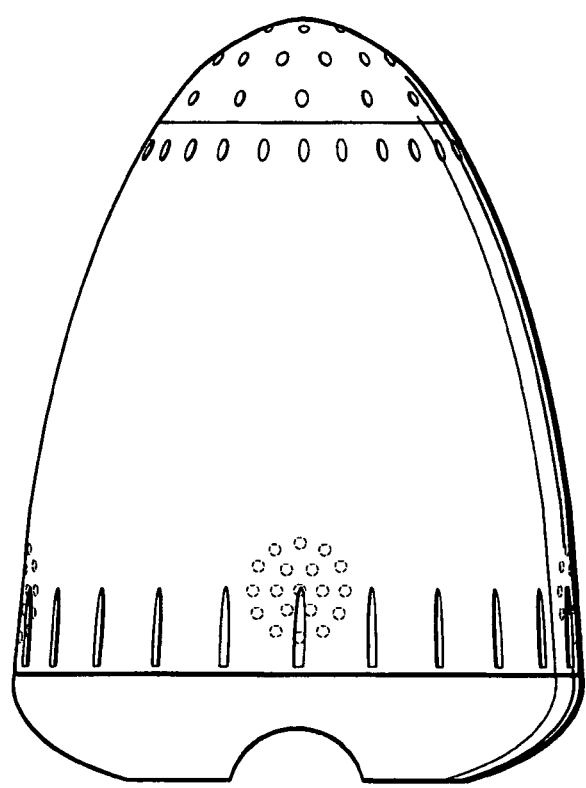
FIG. 1 depicts one dispenser structure useful in the invention having a flattened bottom end with indentations or "channels", an ovoid top end, individual slits and circular patterns of holes near the bottom end, holes at the top end. The horizontal line near the bottom shows the likely place of separation for a two part clamshell device.
Figure 2:
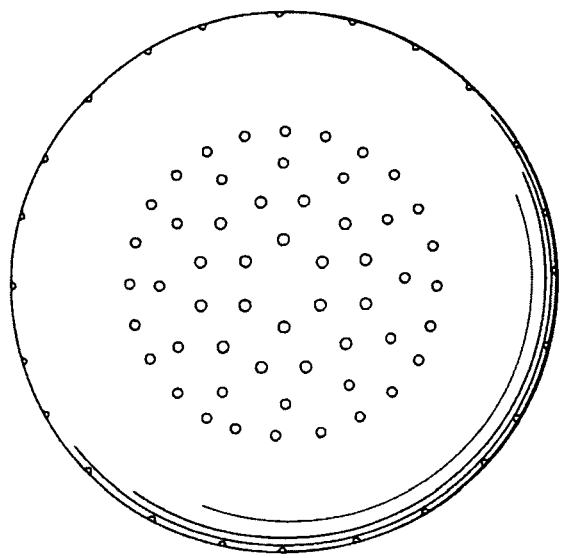
FIG. 2 is an overhead view of the top end of the dispenser.
Figure 3:
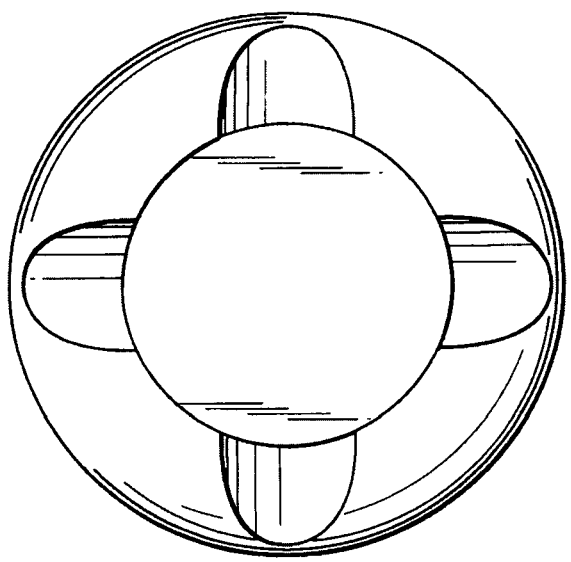
FIG. 3 is a view from beneath the dispenser showing the channels and indents in the bottom end of the dispenser.

When used with a water treatment that evolves gas, the openings are positioned in a way to not only allow water to enter and exit the internal region of the dispenser, but are also arranged to facilitate the desired exit of evolved gas.

The example shown in the drawings relate to a specific embodiment wherein a dispenser body has a flattened end which serves as the bottom of the device. That is, in this particular embodiment, the dispenser is designed so that under many conditions it will orient itself with the flattened bottom end resting on the floor of the body of water and the opposite end becomes the top end of the dispenser, i.e., faces the surface of the water. This can be achieved for example when the bottom part of the body of the dispenser has a higher density than the top part of the dispenser. Indentations or channels near the bottom of the egg aid in handling the dispenser, especially when dosing the dispenser, but also aid in allowing the bottom to settle efficiently on the bottom of the body of water. In certain other embodiments, a self orienting dispenser is used which likewise has a bottom part with a higher density than the top part but does not have a flattened end.

In one particular embodiment it was discovered that the dispenser operated more efficiently with a hole at the top of the dispenser in order to let the gas escape and not form a gas pocket, i.e., the apex of the narrow top portion of an oval shaped dispenser as seen in the figures. It was also discovered that while holes are needed near the bottom of the dispenser, they do not need to be directly at the apex of the bottom. Instead they can be on the part where the sides begin to slope up. This allows a space to collect small particles in the bottom of the dispenser. The holes near the bottom of the dispenser need to be low enough that a minimal amount of gas generated is captured at the bottom apex of the dispenser. The holes near the bottom allow water to enter the dispenser as the gas is generated and exits out the top.

In particular embodiments, such as that shown in the drawings wherein the top part of the body tapers to a pointed or rounded apex at a selected distance from an exterior surface of the bottom part, a portion of the openings comprised by the body are situated at a distance from the apex that is 20% or less of the selected distance of apex to exterior surface of the bottom part, and a portion of the openings comprised by the body are situated at a distance from the exterior surface of the bottom part that is 30% or less of the distance of apex to exterior surface of the bottom part.

Of course, the dispenser can still function adequately in other orientations, e.g., when the bottom part and top part are in a line parallel to the surface. In some cases, the production of gas serves to re-orient the dispenser with so that the bottom part becomes in contact with the floor of the body of water. Orienting the device in the flat side down direction allows for effective dispersion of the gas from the top of this particular dispenser, i.e., the part of the dispenser facing the surface of the water, where a significant number of the openings are located. However, dispensers useful in the invention need not self orient or have a designated bottom part and top part.

There is no particular limitation to where openings may be placed in the dispenser, whether self orienting or not. For example, in the embodiment shown in the drawings there are a number of openings in the "sides" of the dispenser. One may intuitively believe that when using a fizzing water treatment in the self orientating ovoid dispenser of the drawings holes would be needed at the top part and near the bottom part in order to let the water in and the gas generated out. However, it was discovered that holes on the "side", in one example at the largest diameter, provide for more consistent performance. This is most dramatically seen in the case where the dispenser lands on its side when tossed into the pool, but can be true in general. The actual position and pattern of these holes is variable. In FIG. 1 they appear in a circular pattern are very near one end of the dispenser, here it is the bottom part, but they are often positioned closer to top of the dispenser, for example approximately the midpoint between the "bottom slits" and the "top holes" in the figure.

As mentioned above, a variety of dispenser designs may be used in the present invention and need not have a designated bottom part or be self orienting. Each design will have a preferred number and placement for the openings, which are not limited by the invention, and are readily discerned through routine experiments.

In some embodiments the dispenser may comprise a body that is mainly openings, that is the body of the dispenser may have an external surface area wherein 50 to 99% of the external surface area consists of the void surface area of the plurality of openings. In an extreme example, the body may appear to be composed of little more than a mesh, which is largely holes defined by a thin network of material, e.g., 80 to 99% of the external surface area may be void area. The dispenser may be a sieve-like wherein the material network is more substantial and the void area due to the openings may up 50 to 80% of the body surface area. Often, the void area of the body will be 1 to 50% of the external surface area. For example, the dispenser may be a shaped article wherein less than half of the surface is void area. For example, the body may comprise a small amount of void area, i.e., 1 to 20%, e.g., 2 to 10% void area, in some designs 3 to 10%, 1 to 5% or 10 to 20% may be void area. In other embodiments, 20 to 50%, for example 20 to 35% or 30 to 45%, of the surface area may be void area.

Regardless of the shape of the dispenser, number of openings, or total surface void area it should be remembered that overly large openings would defeat some of the purpose of using a dispenser as chunks of non-dissolved material can escape. Overly large openings may also diminish the visual impact of the present system, for example, it may provide a dilute color stream of limit the visual impact of foaming or fizzing. On the other hand, overly small openings, misplaced openings or too few openings can cause a buildup of gas and premature floatation of the dispenser or simply clog the device.

Thus, while a variety of dispenser shapes and opening placements are envisioned, such shapes and opening placements are readily apparent to one skilled in the art through normal experimentation in light of the present disclosure.

Construction of the dispenser body and the placement of the water treatment composition inside the body can be carried out in a number of ways. The dispenser may comprise two or more separable pieces or it may be one piece e.g., a hinged one piece design. It may be readily opened for multiple loadings or it may be purchased for a single use, e.g., it may hold a predetermined amount of dissolvable water treatment composition in a non-openable one piece design.

The embodiment in the attached figures shows a two piece clam shell design. In this embodiment, the water treatment composition is place in one part of the body and then other part is attached. In some embodiments the two parts are affixed to each other, with the water treatment inside, in a manner that causes the two parts to adhere or otherwise stay connected to each other to prevent tampering. In other embodiments, the dispenser can be opened and reused.

Any number of materials can be used in the construction of the dispenser body, with the caveat that the material, or combination of materials, produces a body that when empty will float in water, but will sink when the water treatment composition is added. Thus, in one embodiment the body of the dispenser is made primarily from materials that have a density at or less than the density of water. In the two piece clamshell design of the figures, it is found that the dispenser more readily orients itself in use with the top part up when the bottom part has a higher density that the top part. One way to achieve this, as seen in the examples, is to add an amount of a dense material, such as metals, to the portion of the dispenser that is to be the bottom. Overall, the density of the dispenser body when complete should be slightly less than 1 so that it will float when the product is completely dispensed.

The body may conveniently be prepared from plastics, such as thermoplastic resins. Examples of such resins include polyolefins, styrenes, polyesters, polycarbonates, polyamides, polyurethanes, ABS, PVC, epoxy resins and the like. Such polymer resins can be shaped or molded using a variety of common processing techniques, including extrusion operations, injection molding operations and rotomolding operations or other melt casting or machining procedures. In many embodiments the body will comprise, or be made from, a polyethylene or polypropylene resin.

The dispenser containing the water treatment composition can be safely protected using wrappings, such as shrink wrapping, a disposable plastic cover, or it can be provided with any of a number of means for covering or blocking the openings, such as a component blocking the openings that dissolves in the water being treated or a component rotatably attached to the body and having openings which can be moved to align with the openings of the body proper allowing for flow, or aligned to oppose the openings of the body proper to prevent access to the interior.

The dispenser of the invention can be used for dispersing a variety of water treatments, biocides such as algaecides and bactericides, pH controllers such as buffers, sources of bromine or chlorine, amine salts, oxidizing agents such as peroxides, flocculants, scale control and other pool and spa water treatment chemicals. For example, the water treatment may contain as an active component a sanitizer comprising a peroxide source, a chlorine source, a bromine source, an antimicrobial metal or metal compound, e.g., copper, zinc and silver antimicrobial etc, a polyquaternery ammonim or mixtures thereof. More than one active treatment agent may be present in an individual formulation. Many formulations will also contain other components that aid the delivery or activity of the water treatment, such as components to modify the rate of dissolution, aid in proper dispersion of the treatment in the water, maintain a stable form of the water treatment composition while in storage etc.

The dispenser of the invention can be used with any such treatment. As is typical with most pool and spa water treatment dispensers, the water treatment composition of the invention is most conveniently a chemical composition in a solid form, i.e., powder, granules, tablets etc, but the dispenser can also accommodate other product forms.

Good success was observed, for example, when the water treatment composition used with the dispenser of the invention was in the form of tablets. Compositions and methods for preparing water treatment tablets for use in a pool or spa are well known in the field. When using a water treatment in tablet form, physical properties of the tablet such as hardness, size, porosity etc may play a role in how well it functions.

The following illustrates certain aspects of the invention using a composition which when added to the internal hollow region of the dispenser causes the dispenser to sink when placed in a body of water, e.g., a swimming pool, rise when the selected amount of water treatment has been dispersed, in this case over 90 wt % of the added water treatment has dissolved before the dispenser returns to the surface, and also provides a fizzing signal that the dispenser is functioning as desired.

This particular example dispenses an oxidizer, potassium peroxomonosulfate. One safe source of potassium peroxomonosulfate has the chemical composition $2KHSO_5.KHSO_4.K_2SO_4$, which is for example sold under the trade name Oxone®, and which readily generates potassium peroxomonosulfate, $KHSO_5$.

In this illustration, a solid composition, for example in tablet form, comprising Oxone®, boric acid, alum and optionally a dispersant is placed in the body of the dispenser. In order to create a readily viewed foam or fizz to signify that the dispenser is functioning, carbonate and/or bicarbonate salts are added to the formulation, typically along with an organic carboxylic acid. For example, a solid foaming, water treatment composition useful in the present invention comprising the following is prepared:

20 to 80 wt %, e.g., 40 to 70 wt %, e.g., 50 to 65 wt % OXONE or other active water treatment component,
5 to 35 wt %, e.g., 10 to 30 wt %, e.g., 15 to 25 wt % sodium carbonate or other carbonate/bicarbonate salt
5 to 25 wt %, for example 10 to 20 wt % C1 to C8 carboxylic acid or carboxylic di acid
0.5 to 5% wt %, e.g., 1 to 3 wt % alum or similar component
0.2 to 3 wt %, e.g., 0.5 to 2 wt % Boric acid or derivative thereof, and
0 to 2 wt %, e.g., 0.005 to 1 wt % surfactant.

Optionally colorants, such as pigments or water soluble dyes may be included. Also, a color signal may be provided by release of colored produced via chemical reaction. Other embodiments may also include 0 to 2 wt %, e.g., 0.005 to 1 wt %, of a dispersant, disintegrant, tabletting aid and/or surfactant The composition is prepared using well known procedures. When using a water treatment in tablet form, physical properties of the tablet such as hardness, size, porosity etc may play a role in how well it functions. With these particular OXONE compositions, excellent results were obtained using a tablet or a plurality of tablets wherein each tablet has a hardness of about 20 pounds break strength or higher.

Each of the above components is well known in the art as are common equivalents of each, which may be substituted in their place. For example, carbonate or bicarbonate salts of sodium, potassium, lithium and the like may be used; dicarboxylic acids such as adipic and the like are conveniently used. Alum refers to hydrated potassium aluminum sulfate (potassium alum) with the formula $KAl(SO_4)_2.12H_2O$, but many similar components, i.e., double sulphate salts, may be used, e.g., compounds of the formula $AM(SO_4)_2.12H_2O$ where A is a monovalent cation such as sodium, potassium or ammonium and M is a trivalent metal ion. The presence of a surfactant is optional, but when present it can be selected from a wide variety of surfactants including linear and branched alkylbenzene sulfonates, e.g., sodium dodecylbenzene sulfonate, phosphates, Alcohol ethoxylates, other ethoxylates or propoxylates, sodium laureth sulfate, sodium lauryl ether sulfate, alkyl ethers etc.

When the composition is added to the dispenser and placed in water the dispenser sinks. As the composition dissolves the carbonate or bicarbonate salt and the acid components release carbon dioxide gas which escapes the body openings creating a foaming or fizzing signal which continues until the composition has dissolved. When the appropriate amount of the dose has been dispersed, the dispenser returns to the surface. In many of these particular examples, but not all, the formulations tested were designed so that essentially all of the water treatment dissolved before the dispenser returned to the surface.

In many embodiments better results are obtained with carbonate rather than bicarbonate due to improved stability, determined from DSC data, and the manner in which dissolution occurs.

It must also be noted that OXONE is acidic. When substituting another active component, the acidity or lack of acidity must be considered when determining how much carbonate/bicarbonate and carboxylic acid to add because if the balance between the two is wrong, the visual signals relating to the dispenser working or being empty of treatment may not correlate properly with the desired dissolution of the water treatment.

The amount of water treatment used, and possibly the size of the dispenser body, will vary on the amount of water being treated, as is well known and understood in art. One embodiment of the invention provides a dispenser containing enough of a water treatment to treat a pool containing approximately 5,000 to 20,000 gallons of water, e.g., a poll of about 5,000 to about 15,000 gallons of water, e.g., one particular embodiment provides about 4 to 6 pounds of the OXONE tablets above in a flattened oval shaped dispenser. In other embodiments, the dispenser contains enough water treatment to treat a spa of considerable smaller amounts of water, and obviously, dosed dispensers can be provided that contain enough water treatment for pools and bodies of water in excess of 20,000 gallons.

Of course the water being treated may already contain other water treatments during the use of the inventive dispenser.

EXAMPLES

Unless otherwise specified, all percentages are by weight based on the total weight of the composition.

Example 1

1 inch tablets with about 20 pounds break strength were prepared by standard processing methods from a formulation comprising:

| | |
|---|---|
| Oxone | 60% |
| Sodium Carbonate | 22.2% |
| Adipic Acid | 14.8% |
| Alum | 2% |
| Boric Acid | 0.95% |

Example 2

1 inch tablets with about 20 pounds break strength were also prepared as above from a formulation which also included 0.1% of an alkyl benzene sulfonate.

Example 3

1 inch tablets with about 20 pounds break strength are also prepared as in Example 1 from a formulation which also included 0.1% of a purple organic pigment.

The tablets were placed in a prototype dispenser similar in shape to that of the drawings in that it had a flattened bottom portion, a top portion which narrowed, and well positioned openings of proportional size and number. The prototype was tested for buoyancy and orientation, i.e., in this example it was desirable to have the dispenser orient itself in the water with flattened portion in contact with the floor of the water body. These properties were adjusted by affixing metal discs to the body so that an empty body would still float, but a body containing the above composition would sink, and when submerged the flattened portion of the dispenser would serve as the bottom of the device. Obviously, other compositions can be used with the dispenser and ballasts other than metal can be used and which ballast may be incorporated within the skin of the body rather than affixed to a surface of the body.

Once dosed with the composition and sealed the dispenser was gently tossed into a test pool. The dispenser did orientate itself to have the top side up and fizzing was clearly visible. After the fizzing stopped the dispenser floated to the surface and was retrieved and opened to see if any water treatment remained undeserved. Using the above formulations, and by varying the dose, the dispenser was made to fizz for from 3 to 30 minutes during which time all water treatment dissolved.

Tablets according to Experiment 3 caused the fizzing seen with tablets of Examples 1 and 2, but additionally ejected fine purple particles as an additional visual signal of operation. The particles were removed from the water during normal pool hygiene activities, e.g., filtering, vacuuming, etc.

What is claimed:

1. A system for dispensing a water treatment composition into recreational water, said system comprising a dissolvable water treatment composition and a dispenser that sinks in a volume of water when containing a selected full dose of the water treatment composition, and floats in water either when empty or when the dispenser contains a selected minor dose of the water treatment composition, wherein the dispenser comprises a body defining a top part and a bottom part and defining a fully enclosed hollow internal region therein configured to accept a dissolvable water treatment composition, wherein the bottom part comprises a greater density than the top part to maintain a consistent orientation within the water, wherein said body is equipped with a plurality of openings, in a number, size and placement, and total void surface area to a) allow for entrance of water into the hollow internal region thereby contacting and dissolving the water treatment composition to create an aqueous solution and/or suspension of components of the water treatment composition, b) allow for said aqueous solution or suspension of components to exit the body and enter the water, and c) allow for the release of any gasses generated by dissolution of the water treatment composition so that gas created during dissolution of the water treatment composition escapes the body and does not accumulate to an extent where it causes the dispenser to float in water before the desired amount of water treatment has been dispensed; wherein the bottom part consists of an opening-free construction and a floor-contacting flattened end, wherein the top part comprises a geometry that tapers from a base region to an apex, wherein the base region releasably engages the bottom part, wherein the base region comprises a plurality of water-receiving openings providing access to the hollow internal volume, and the apex comprises a plurality of gas-releasing openings releasing gas from the hollow internal volume.

2. The system according to claim 1 wherein the body of the dispenser has an external surface area wherein 1 to 50% of the external surface area consists of the void surface area of the plurality of openings.

3. The system according to claim 1 wherein the body of the dispenser has an external surface area wherein 50 to 99% of the external surface area consists of the void surface area of the plurality of openings.

4. The system according to claim 1 wherein the dispenser sinks when containing the water treatment composition and remains fully submerged until the water treatment composition has essentially dissolved.

5. The system according to claim 1 wherein the dispenser comprises a hinged one piece design.

6. The system according to claim 1 wherein the dispenser comprises 2 or more separable pieces.

7. The system according to claim 1 wherein a first portion of the openings are situated at a distance from the apex that is 20% or less of the selected distance of apex to the base region, and a second portion of the openings are situated at a distance from the base region that is 30% or less of the distance of apex to the bottom part.

8. The system according to claim 7 wherein the body of the dispenser comprises an opening at the apex of the top part of the body.

9. The system according to claim 8 wherein the body self orients itself with the bottom part facing the bottom of the volume of water.

10. The system according to claim 1 wherein the dispenser comprises a means for blocking the openings, said means selected from a component blocking the openings that dissolves in the water being treated, a removable wrap, a disposable plastic cover, a component rotatably attached to the body and having openings which can be moved to align with the openings of the body proper allowing for flow, or aligned to oppose the openings of the body proper to prevent access to the interior.

11. The system according to claim 1 wherein the dissolvable water treatment composition produces gas bubbles upon dissolution.

12. The system according to claim 11 wherein the dissolvable water treatment composition comprises an active treatment component, a carbonate and/or bicarbonate salt, and an organic acid.

13. The system according to claim 12 wherein the active component is a sanitizer comprising a peroxide source, a chlorine source, a bromine source, a polyquaternery ammonium, an antimicrobial metal or mixtures thereof.

14. The system according to claim 13 wherein the dissolvable water treatment composition comprises a source of potassium peroxomonosulfate.

15. The system according to claim 1 wherein the dissolvable water treatment composition is a solid.

16. The system according to claim 1 wherein the dissolvable water treatment composition is a tablet or a plurality of tablets wherein each tablet has a hardness of about 20 pounds break strength or higher.

* * * * *